(12) United States Patent
Sohn et al.

(10) Patent No.: US 7,283,448 B2
(45) Date of Patent: Oct. 16, 2007

(54) INTEGRATED OPTICAL PICKUP AND METHOD OF MANUFACTURING THE SAME AND OPTICAL INFORMATION STORAGE SYSTEM INCLUDING THE OPTICAL PICKUP

(75) Inventors: Jin-seung Sohn, Seoul (KR);
Myung-bok Lee, Suwon-si (KR);
Mee-suk Jung, Suwon-si (KR);
Eun-hyoung Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 546 days.

(21) Appl. No.: 10/841,973

(22) Filed: May 10, 2004

(65) Prior Publication Data
US 2005/0025027 A1 Feb. 3, 2005

(30) Foreign Application Priority Data
May 9, 2003 (KR) .................. 10-2003-0029366
Apr. 29, 2004 (KR) .................. 10-2004-0029854

(51) Int. Cl.
*G11B 7/00* (2006.01)
(52) U.S. Cl. .................. 369/112.01; 369/44.12
(58) Field of Classification Search ........... 369/112.01, 369/112.23, 112.07, 44.12, 44.14, 112.02, 369/112.1, 112.03, 112.21, 44.23, 44.24
See application file for complete search history.

(56) References Cited
U.S. PATENT DOCUMENTS
5,317,551 A 5/1994 Shiono 5,687,155 A * 11/1997 Fukakusa et al. ...... 369/112.06
5,812,518 A * 9/1998 Fukakusa .................... 720/682
6,104,690 A 8/2000 Feldman et al.
6,351,443 B1 * 2/2002 Freeman ................ 369/112.07

FOREIGN PATENT DOCUMENTS

| EP | 0 555 097 A1 | 8/1992 |
|---|---|---|
| JP | 7-21581 A | 1/1995 |
| JP | 09-102650 A | 4/1997 |
| JP | 09-246420 A | 9/1997 |
| JP | 2002-335032 A | 11/2002 |
| WO | 01/43126 A2 | 6/2001 |

* cited by examiner

*Primary Examiner*—Nabil Hindi
(74) *Attorney, Agent, or Firm*—Sughrue Mion Pllc.

(57) ABSTRACT

An integrated optical pickup and a manufacturing method thereof, and an optical information storage system including the pickup. The integrated optical pickup includes a light source; a main photo-detector, which receives light emitted from the light source and reflected from an optical information storage medium; a light-collecting and optical path separating member, which focuses light emitted from the light source on the optical information storage medium and separates an optical path of light incident on the optical information storage medium from an optical path of light reflected from the optical information storage medium; and an optical bench, which is coupled to the light-collecting and optical path separating member, an optical path being formed between the light source and the main photo-detector, and the light-collecting and optical path separating member, and the optical bench and the light-collecting and optical path separating member being respectively formed on a wafer and then obtained by being separated into a plurality of assemblies.

24 Claims, 12 Drawing Sheets

INTEGRATED OPTICAL PICKUP AND METHOD OF MANUFACTURING THE SAME AND OPTICAL INFORMATION STORAGE SYSTEM INCLUDING THE OPTICAL PICKUP

This application claims priority from Korean Patent Application Nos. 2003-29366, filed on May 9, 2003 and 2004-29854, filed on Apr. 29, 2004, in the Korean Intellectual Property Office, the disclosures of which are incorporated herein in their entirety by reference.

BACKGROUND OF THE INVENTION

1. Field of the Invention

The present invention relates to an optical pickup and a method of manufacturing the same, and an optical information storage system including the optical pickup, and more particularly, to an ultra-small integrated optical pickup which can be mass produced in a simple process and a method of manufacturing the same, and an optical information storage system including the optical pickup.

2. Description of the Related Art

Optical information storage systems include optical pickup devices to record information on optical discs and/or reproduce the information from the optical discs. The optical information storage systems are different from other information storage systems in that they have the advantages of possibility of media distribution, portability, high capacity, prevention of information leakage, and so on.

Optical discs have been developed from compact discs (CDs) having a diameter of 12 cm and a substrate thickness of 1.2 mm to digital versatile discs (DVDs) having a diameter of 12 cm and a substrate thickness of 0.6 mm. Blu-ray discs are even thinner than DVDs. Optical information storage systems for recording information on the optical discs and reproducing the information from the optical discs are being developed to focus high optical energy on a small spot and achieve a high recording density keeping pace with the development of the optical information media. For example, optical information storage systems for CDs employ a light source having a wavelength of 780 nm and an objective lens having a numerical aperture (NA) of 0.45, and optical information storage systems for DVDs employ a light source having a wavelength of 650 nm and an objective lens having an NA of 0.6.

In recent years, as optical discs have been manufactured with higher density and higher capacity, numerous studies have been made to increase an NA of an objective lens to reduce the size of a light spot and manufacture thin-type optical parts to create an ultra-small optical pickup. Typically, attempts have been made to reduce the size of optical parts to reduce the entire size of an optical information storage system. However, this approach has technical limitations.

In this respect, an attempt to manufacture an optical pickup using a MEMS process has been made to solve the above problem. The conventional optical pickup manufacturing method suffers from low reliability and low automation ratio in adhering and adjusting ultra-small parts of several hundreds of microns due to an assembling error of the parts. However, when the optical pickup is manufactured using a MEMS process, the optical pickup can be batch-processed, thereby offering a possibility that an ultra-small optical pickup can be realized by integrating general electronic parts, and a price of an optical information storage system comprising the optical pickup can be reduced as well. However, the ultra-small optical pickup made using the semiconductor process and the optical information storage system comprising the pickup have not been developed yet.

SUMMARY OF THE INVENTION

The present invention provides an ultra-small integrated optical pickup which can be realized on a wafer using MEMS technology and a method of manufacturing the same, and an optical information storage system including the pickup.

According to an aspect of the present invention, there is provided an integrated optical pickup comprising: a light source; a main photo-detector, which receives light emitted from the light source and reflected from an optical information storage medium; a light-collecting and optical path separating member, which focuses light emitted from the light source on the optical information storage medium and separates an optical path of light incident on the optical information storage medium from an optical path of light reflected from the optical information storage medium; and an optical bench, which is coupled to the light-collecting and optical path separating member, an optical path being formed between the light source and the main photo-detector, and the light-collecting and optical path separating member, and the optical bench and the light-collecting and optical path separating member being respectively formed on a wafer and then obtained by separated into a plurality of assemblies.

According to another aspect of the present invention, there is provided a method of manufacturing an integrated optical pickup, which includes a light-collecting and optical path separating member for focusing light emitted from a light source on an optical information storage medium and separating an optical path of light incident on the optical information storage medium from an optical path of light reflected from the optical information storage medium, and an optical bench wherein an optical path is formed between the light source and a main photo-detector, and the light-collecting and optical path separating member, the method comprising: preparing an optical bench wafer on which an optical bench is formed and a light-collecting and optical path separating member wafer on which a light-collecting and optical path separating member is formed; coupling the light-collecting and optical path separating member wafer to the optical bench wafer to form an integrated optical pickup assembly wafer, dicing the optical pickup assembly wafer or dicing the light-collecting and optical path separating member wafer and the optical bench wafer, and coupling a light-collecting and optical path separating member and an optical bench obtained through the dicing to form an integrated optical pickup assembly; and wiring and packaging the integrated optical pickup assembly.

According to still another aspect of the present invention, there is provided an optical information storage system comprising: an integrated optical pickup including: a light source; a main photo-detector, which receives light emitted from the light source and reflected from an optical information storage medium; a light-collecting and optical path separating member, which focuses light emitted from the light source on the optical information storage medium and separates an optical path of light incident on the optical information storage medium from an optical path of light reflected from the optical information storage medium; and an optical bench, which is coupled to the light-collecting and optical path separating member, an optical path being formed between the light source and the main photo-detector, and the light-collecting and optical path separating member, the integrated optical pickup being obtained by forming respectively the optical bench and the light-collecting and optical path separating member on a wafer and then separating the wafers into a plurality of assemblies; an optical information storage medium rotating unit, which rotates the optical information storage medium; a driving unit, which drives the integrated optical pickup and the optical information storage medium rotating unit; and a controller, which controls the driving unit to control focusing and tracking servos.

The optical bench may include a first lateral side part having a first surface that reflects the light emitted from the light source toward the light-collecting and optical path separating member.

The light source may be disposed on a bottom part of the optical bench, and the main photo-detector may be disposed on either the bottom part of the optical bench or a second lateral side part opposite to the first lateral side part.

The integrated optical pickup may further comprise a monitor photo-detector, which monitors the intensity of light of the light source, and the monitor photo-detector may be disposed at the same surface as the main photo-detector, or the main photo-detector is disposed on one of the bottom part and the second lateral side part of the optical bench and the monitor photo-detector is disposed on the remaining one.

The integrated optical pickup may further comprise a monitor photo-detector, which monitors the intensity of light of the light source, and the main photo-detector and the monitor photo-detector may be disposed on the bottom part of the optical bench to be located at both sides of the light source. The integrated optical pickup may further comprise a prism, which is interposed between the light source and the monitor photo-detector to cause the light emitted from the light source to be incident on the monitor photo-detector.

The light source may be disposed on the bottom part of the optical bench and the main photo-detector may be disposed on a support part that faces the bottom part and is positioned on the optical bench. The optical bench may further include a second lateral side part, which is opposite in position to the first lateral side part and has a second surface for reflecting the light reflected from the optical information storage medium and the first surface toward the main photo-detector.

The integrated optical pickup may further comprise a monitor photo-detector, which is disposed on the support part to monitor the intensity of light of the light source.

The support part may be either an extension of the light-collecting and optical path separating member or a spacer into which the light-collecting and optical path separating member is inserted.

The light source and the main photo-detector may be disposed on a support part coupled to the optical bench, and the optical bench may further include a second lateral side part, which is opposite in position to the first lateral side part and has a second surface for reflecting the light emitted from the light source toward the first surface.

The optical bench may have an opened structure in a bottom part.

The integrated optical pickup may further comprise a monitor photo-detector, which monitors the intensity of light of the light source, and the main photo-detector and the monitor photo-detector may be side by side with the light source at one side of the light source.

The light-collecting and optical path separating member may be composed of a light-collecting member and an optical path separating member.

The light-collecting member may include one of a refractive lens, a diffractive lens and a gradient index lens being used singly or plurally, and a hybrid lens composed of at least two kinds of the lenses.

The optical path separating member may include a holographic optical element (HOE) or a diffractive optical element (DOE).

The optical path separating member may include a polarization diffraction element and a quarter wave-plate.

The integrated optical pickup may further comprise a spacer having an aperture and disposed between the light-collecting member and the optical path separating member.

The optical bench may have a stepped portion on which the light-collecting and optical path separating member is placed.

Since the light-collecting member and the optical bench are formed on the wafers, coupled to each other, and then diced, an ultra-small optical pickup and an optical information storage device provided with the ultra-small optical pickup can be mass produced at low costs.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1A:
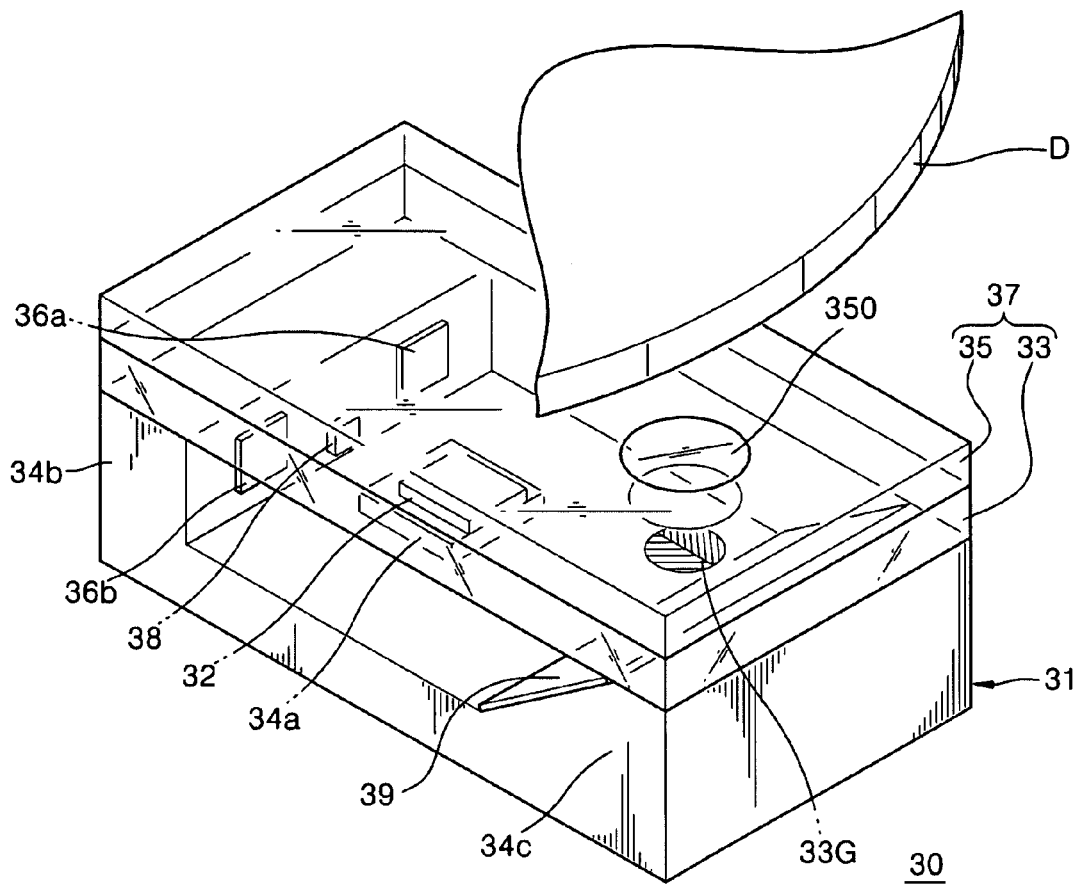
FIG. 1A is a schematic perspective view of an optical pickup according to a first exemplary embodiment of the present invention.
Figure 1B:
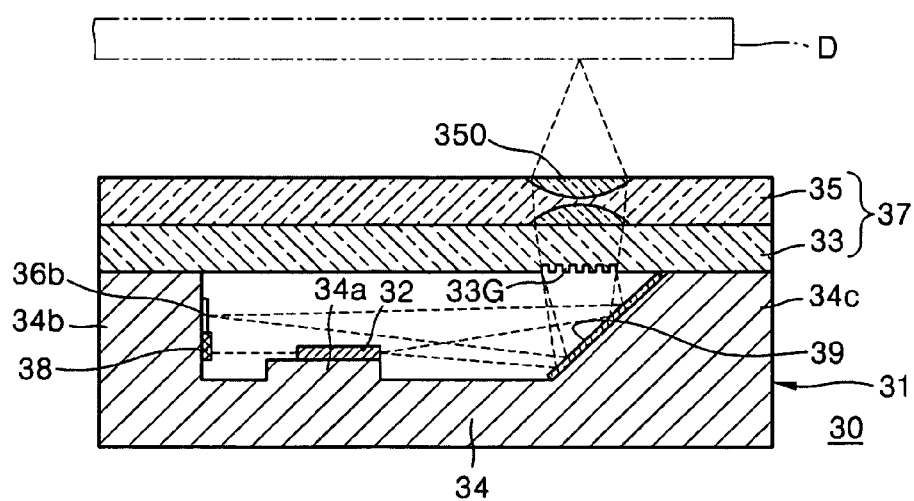
FIG. 1B is a cross-sectional view of the optical pickup shown in FIG. 1A.

FIG. 1A is a perspective view of an optical pickup according to a first exemplary embodiment of the present invention, and FIG. 1B is a cross-sectional view of the optical pickup shown in FIG. 1A.

Referring to FIGS. 1A and 1B, an optical pickup 30 includes an optical bench 31 and a light-collecting and optical path separating member 37, which are formed on wafers and then are coupled. The optical bench 31 has a bottom part 34, a first lateral side part 34c, and a second lateral side part 34b. A light source 32 for emitting light and a first mount 34a on which the light source 32 is mounted are disposed on the bottom part 34 of the optical bench 31. A first surface 39, namely, a mirror for reflecting light emitted from the light source 32 toward an optical disc D is formed on the first lateral side part 34c of the optical bench 31. Main photo-detectors 36a and 36b for receiving light reflected from the optical information storage medium, namely, the optical disc D, and a monitor photo-detector 38 disposed at one side of the bottom part 34 for directly receiving light emitted from the light source 32 are disposed on the second lateral side part 34b of the optical bench 31. The light-collecting and optical path separating member 37 includes an optical path separating member 33 on which a diffraction grating 33G is formed and a light-collecting member 35 on which an objective lens 350 is formed.

The optical bench 31 has a bottom surface and lateral surfaces formed with the second and first lateral side parts 34b and 34c. The light-collecting and optical path separating member 37 is formed over the optical bench 31. Here, the light-collecting member 35 on which the objective lens 350 is formed and the optical path separating member 33 on which the diffraction grating 33G is formed may be diced into small parts, and other portions of the light-collecting and optical path separating member 37 on which the objective lens 350 and the diffraction grating 33G are not formed may be made of the same material as the optical bench 31.

An optical path shown in FIG. 1B is formed such that light forwardly emitted from the light source 32 is reflected from the first surface 39, passes through the diffraction grating 33G, is focused by the objective lens 350, and is forwarded to the optical disc D. Further, light reflected from the optical disc D passes through the objective lens 350, is diffracted by the diffraction grating 33G, and is forwarded to the main photo-detectors 36a and 36b. Additionally, light backwardly emitted from the light source 32 is received by the monitor photo-detector 38.

A laser diode is usually used as the light source 32. Particularly, a laser diode emitting light with a blue wavelength, e.g., a wavelength of 405 nm may be used to record and/or reproduce information on a high-density optical disc.

A holographic optical element (HOE) or a diffractive optical element (DOE) may be used as the diffraction grating 33G formed on the optical path separating member 33. The diffraction grating 33G separates an optical path of the light incident on the optical disc D from an optical path of the light reflected from the optical disc D.

The objective lens 350 is an optical member that focuses the light directed toward the optical disc D and forms a light spot on a recording surface of the optical disc D. Any one of a refractive lens, a gradient index (GRIN) lens, and a diffractive lens may be used singly or plurally as the objective lens 350, or a hybrid lens composed of at least two kinds of the lenses may be used as the objective lens 350. Here, the GRIN lens is a lens whose refractive index varies, either axially or radially.

When a hybrid lens composed of at least two kinds of a refractive lens, a GRIN lens, and a diffractive lens is used as the objective lens 350, the lenses of the hybrid lens can perform a mutual complementary function so that any aberration, such as chromatic aberration or a spherical aberration, can be minimized. For example, the longer the wavelength, the larger a diffractive angle of the diffractive lens and the smaller a refractive angle of the refractive lens. Thus, when the diffractive lens and the refractive lens are combined, a chromatic aberration according to the wavelength of the light source 32 can be restrained.

Figure 2A:
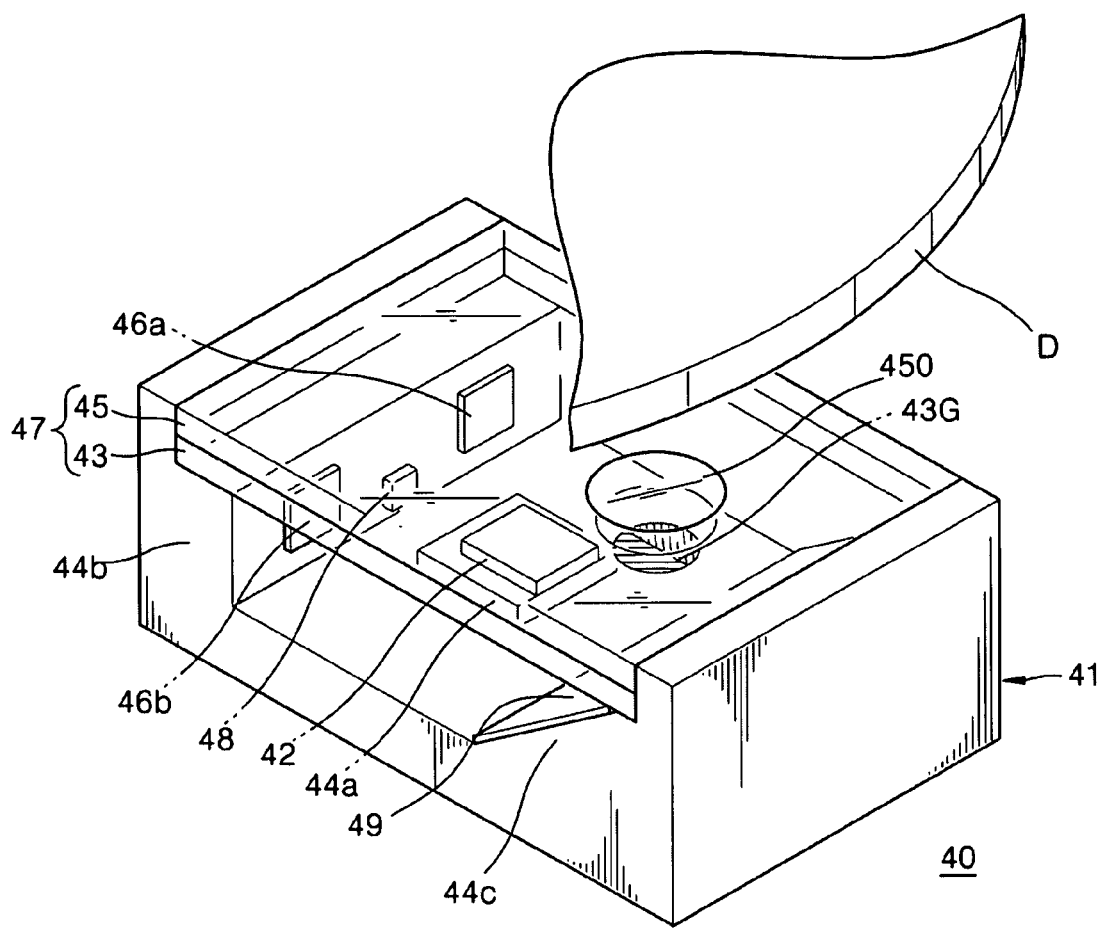
FIG. 2A is a schematic perspective view of an optical pickup according to a second exemplary embodiment of the present invention.
Figure 2B:
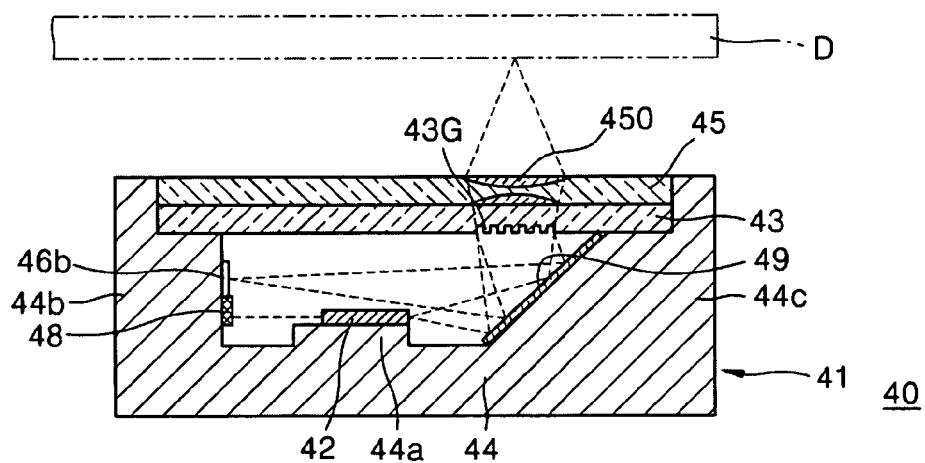
FIG. 2B is a cross-sectional view of the optical pickup shown in FIG. 2A.

FIGS. 2A and 2B are respectively a perspective view and a cross-sectional view of an optical pickup according to a second exemplary embodiment of the present invention. An optical pickup 40 according to the second exemplary embodiment shown in FIGS. 2A and 2B is similar in construction to the optical pickup 30 according to the first exemplary embodiment shown in FIGS. 1A to 1B, but is different in that second and first lateral side parts 44b and 44c have stepped portions such that a light-collecting and optical path separating member 47 is diced to have a smaller width than the light-collecting and optical path separating member 37 of the optical pickup 30.

Referring to FIGS. 2A and 2B, reference numeral 41 denotes an optical bench, 42 denotes a light source, 43 denotes an optical path separating member, 43G denotes a diffraction grating, 44 denotes a bottom part, 44a denotes a first mount, 44b denotes the second lateral side part, 44c denotes the first lateral side part, 45 denotes a light-collecting member, 46a and 46b denote main photo-detectors, 47 denotes the light-collecting and optical path separating member, 48 denotes a monitor photo-detector, and 49 denotes a first surface.

Functions of the optical elements of the optical pickup 40 and an optical path according to the second exemplary embodiment are similar or equal to those of the optical pickup 30 according to the first exemplary embodiment.

Figure 3A:
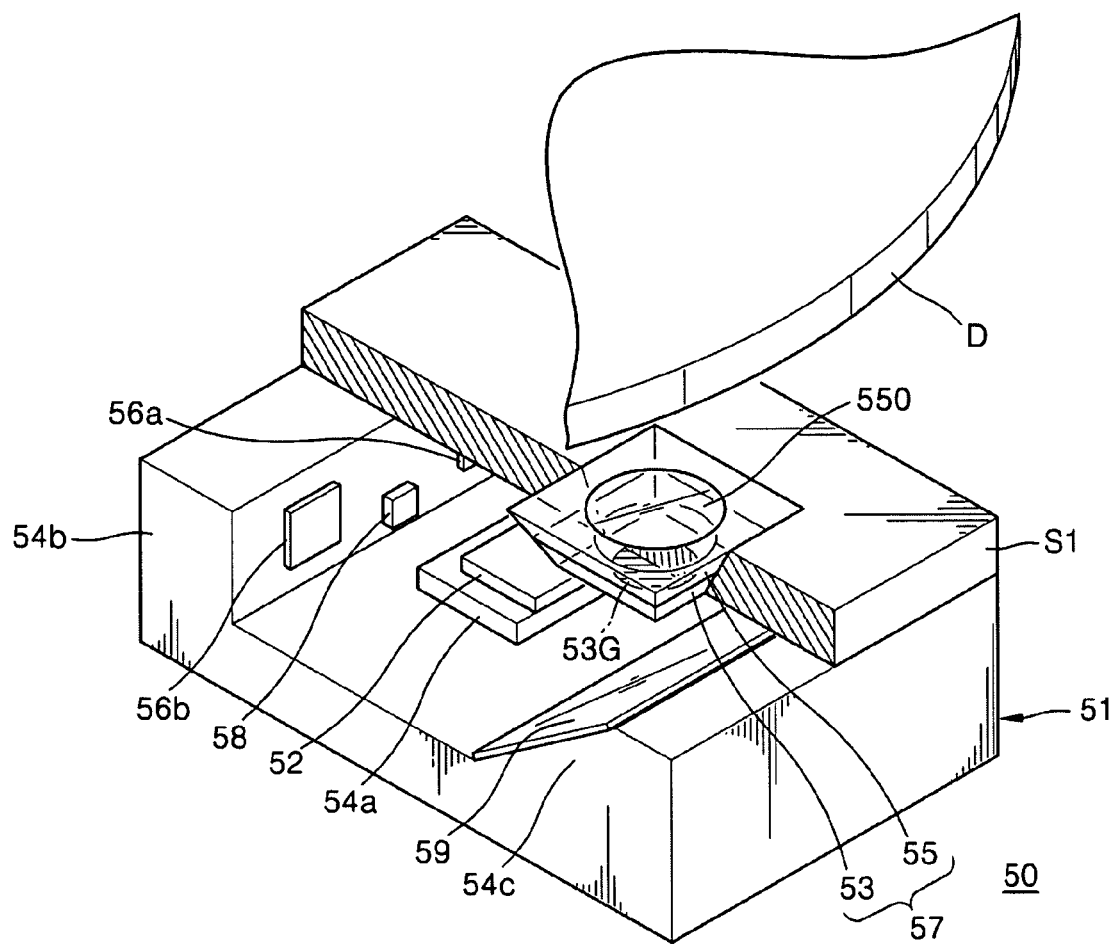
FIG. 3A is a partial cut-away perspective view of an optical pickup according to a third exemplary embodiment of the present invention.
Figure 3B:
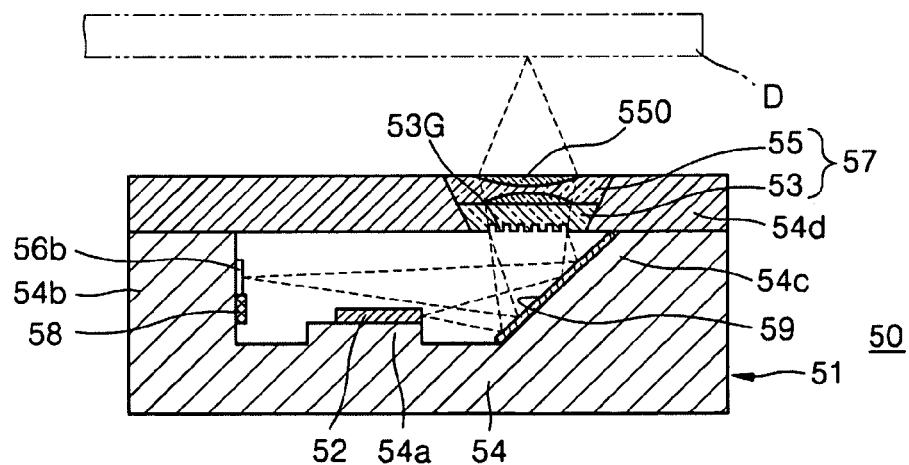
FIG. 3B is a cross-sectional view of the optical pickup shown in FIG. 3A.

FIGS. 3A and 3B are respectively a perspective view and a cross-sectional view of an optical pickup according to a third exemplary embodiment of the present invention. Referring to FIGS. 3A and 3B, an optical pickup 50 according to the third exemplary embodiment is different from the optical pickup 30 according to the first exemplary embodiment in that a light-collecting and optical path changing member 57 formed on a wafer is diced to conform to the size of an objective lens 550 and is inserted into an aperture formed in a spacer S1 adhered to an optical bench 51.

Referring to FIGS. 3A and 3B, reference numeral 52 denotes a light source, 53 denotes an optical path separating member, 53G denotes a diffraction grating, 54 denotes a bottom part, 54a denotes a first mount, 54b denotes a second lateral side part, 54c denotes a first lateral side part, 55 denotes a light-collecting member, 550 denotes an objective lens, 56a and 56b denote main photo-detectors, 57 denotes the light-collecting and optical path separating member, 58 denotes a monitor photo-detector, 59 denotes a first surface, and S1 denotes the spacer.

Functions of the optical elements of the optical pickup 50 and an optical path according to the third exemplary embodiment are similar or equal to those of the optical pickup 30 according to the first exemplary embodiment.

Figure 4A:
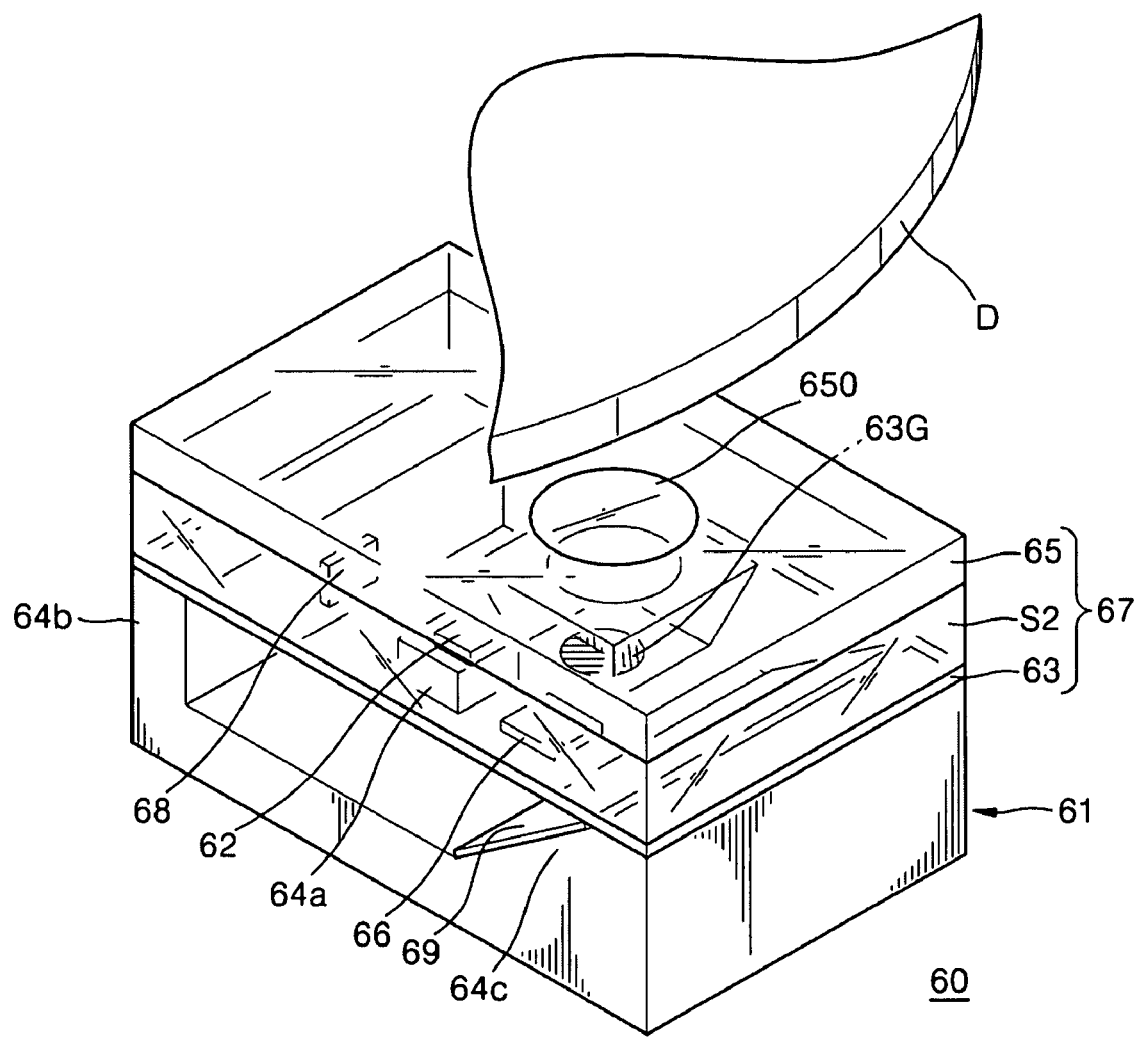
FIG. 4A is a schematic perspective view of an optical pickup according to a fourth exemplary embodiment of the present invention.
Figure 4B:
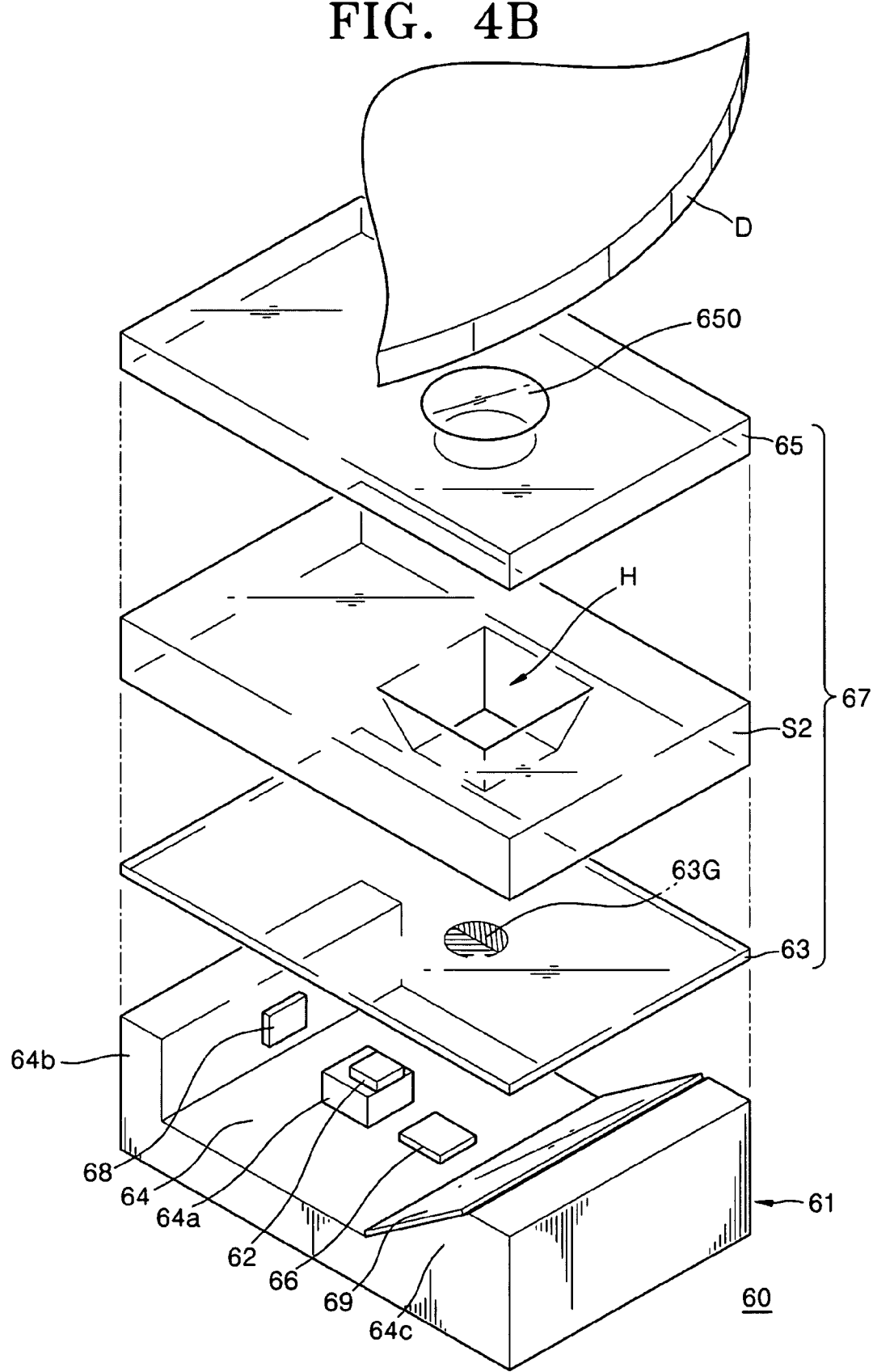
FIG. 4B is an exploded perspective view of the optical pickup shown in FIG. 4A.

FIGS. 4A and 4B are respectively a perspective view and an exploded perspective view of an optical pickup according to a fourth exemplary embodiment of the present invention. Referring to FIGS. 4A and 4B, an optical pickup 60 according to the fourth exemplary embodiment is different from the optical pickup 30 according to the first exemplary embodiment in that an optical path separating member 63, a spacer S2, and a light-collecting member 65 formed on wafers are bonded and diced to form a light-collecting and optical path separating member 67. The spacer S2 has an aperture H formed therein to guide light diffracted by a diffraction grating 63G to an objective lens 650. Further, a light source 62 and a main photo-detector 66 are disposed on a bottom surface of an optical bench 61, and a monitor photo-detector 68 is disposed on a second lateral side part 64b behind the light source 62.

Referring to FIGS. 4A and 4B, reference numeral 63 denotes the optical path separating member, 63G denotes the diffraction grating, 64 denotes a bottom part, 64a denotes a first mount, 64b denotes the second lateral side part, 64c denotes a first lateral side part, 65 denotes the light-collecting member, 650 denotes the objective lens, 66 denotes a main photo-detector, and 69 denotes a first surface.

An optical path is formed such that light emitted from the light source 62 is reflected from the first surface 69, passes through the optical path separating member 63, the spacer S2, and the light-collecting member 65, and is focused on the optical disc D. Further, light reflected from the optical disc D moves in a reverse direction of the right-above optical path, such that it reaches the diffraction grating 63G of the optical path separating member 63 to be diffracted by the diffraction grating 63G and then, is received by the main photo-detector 66. Here, functions of the optical elements of the optical pickup 60 according to the fourth exemplary embodiment are similar or equal to those of the optical pickup 30 according to the first exemplary embodiment.

FIGS. 5A through 7 schematically illustrate a method of manufacturing an optical pickup according to an exemplary embodiment of the present invention.

Figure 5A:
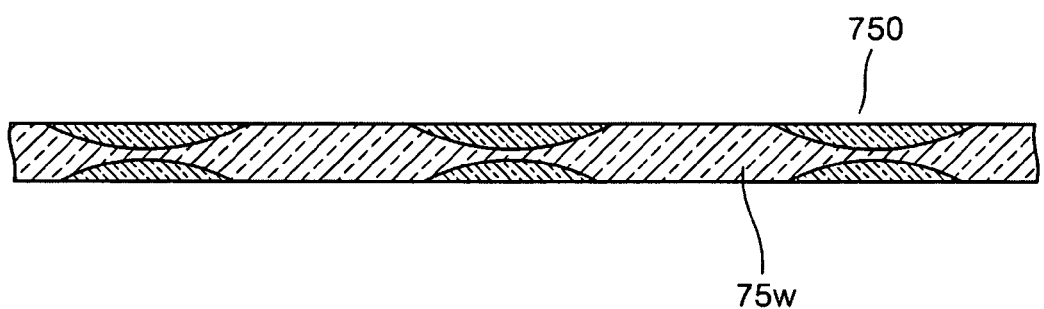
FIG. 5A is a schematic sectional view of a light-collecting member wafer on which objective lenses are formed.
Figure 5B:
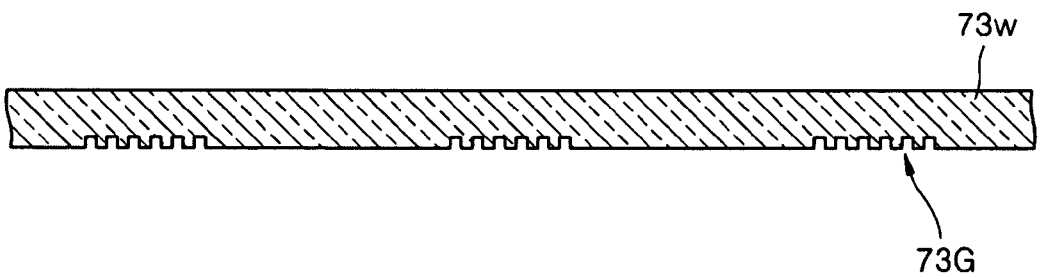
FIG. 5B is a schematic sectional view of an optical path separating wafer on which diffraction gratings are formed.

FIG. 5A is a schematic sectional view of a light-collecting member wafer 75W on which an objective lens 750 is formed. FIG. 5B is a schematic sectional view of an optical path separating member wafer 73W on which a diffraction grating 73G is formed. The objective lens 750 and the diffraction grating 73G are respectively formed on the light-collecting member wafer 75W and the optical path separating member wafer 73W using a MEMS process.

Figure 6A:
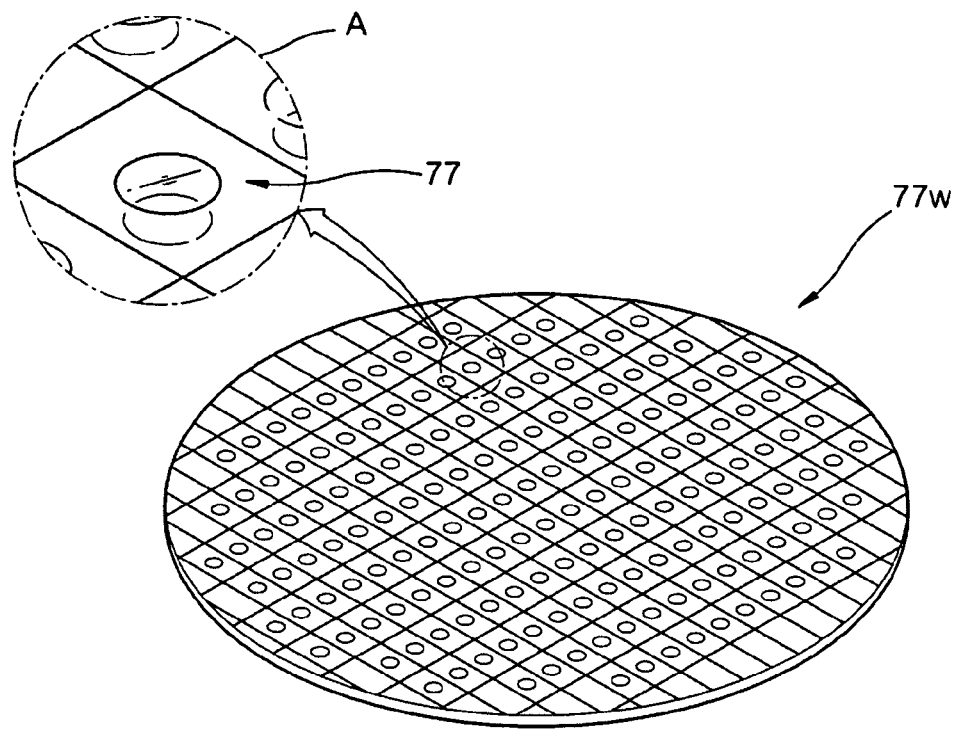
FIG. 6A is a schematic perspective view of a light-collecting and optical path separating member wafer formed by bonding the wafers shown in FIGS. 5A and 5B, a circle A illustrating a partial enlarged view of the light-collecting and optical path separating member wafer.

FIG. 6A is a schematic diagram of a light-collecting and optical path separating member wafer 77W formed by bonding the light-collecting member wafer 75W to the optical path separating member wafer 73W. A circle A is an enlarged view of a light-collecting and optical path separating member 77 of the light-collecting and optical path separating member wafer 77W.

Figure 6B:
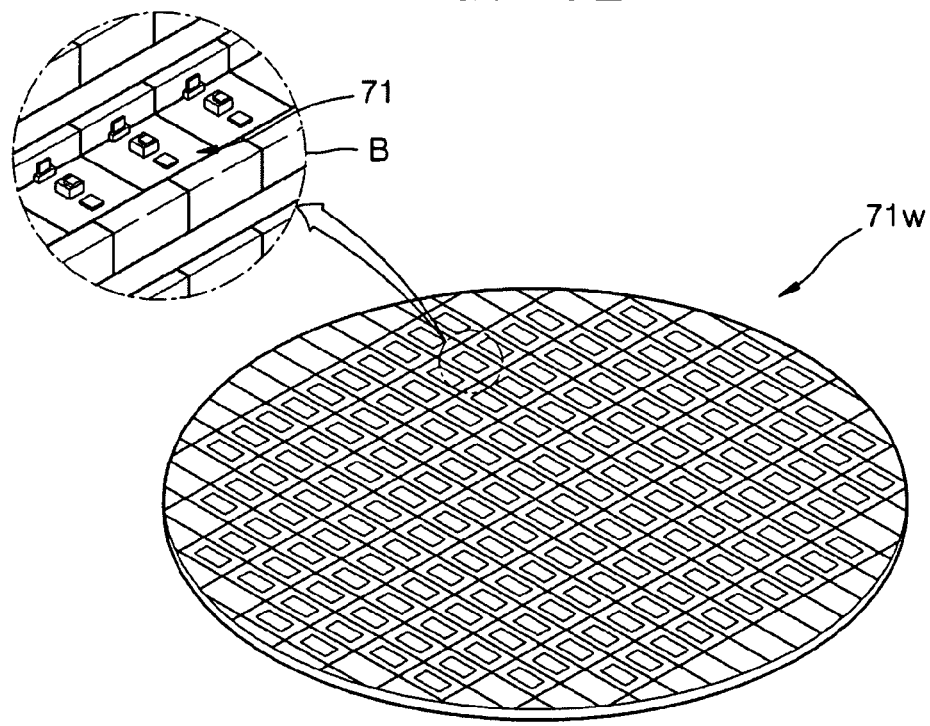
FIG. 6B is a schematic perspective view of an optical bench wafer on which optical benches are formed, a circle B illustrating a partial enlarged view of the optical bench.
Figure 7:
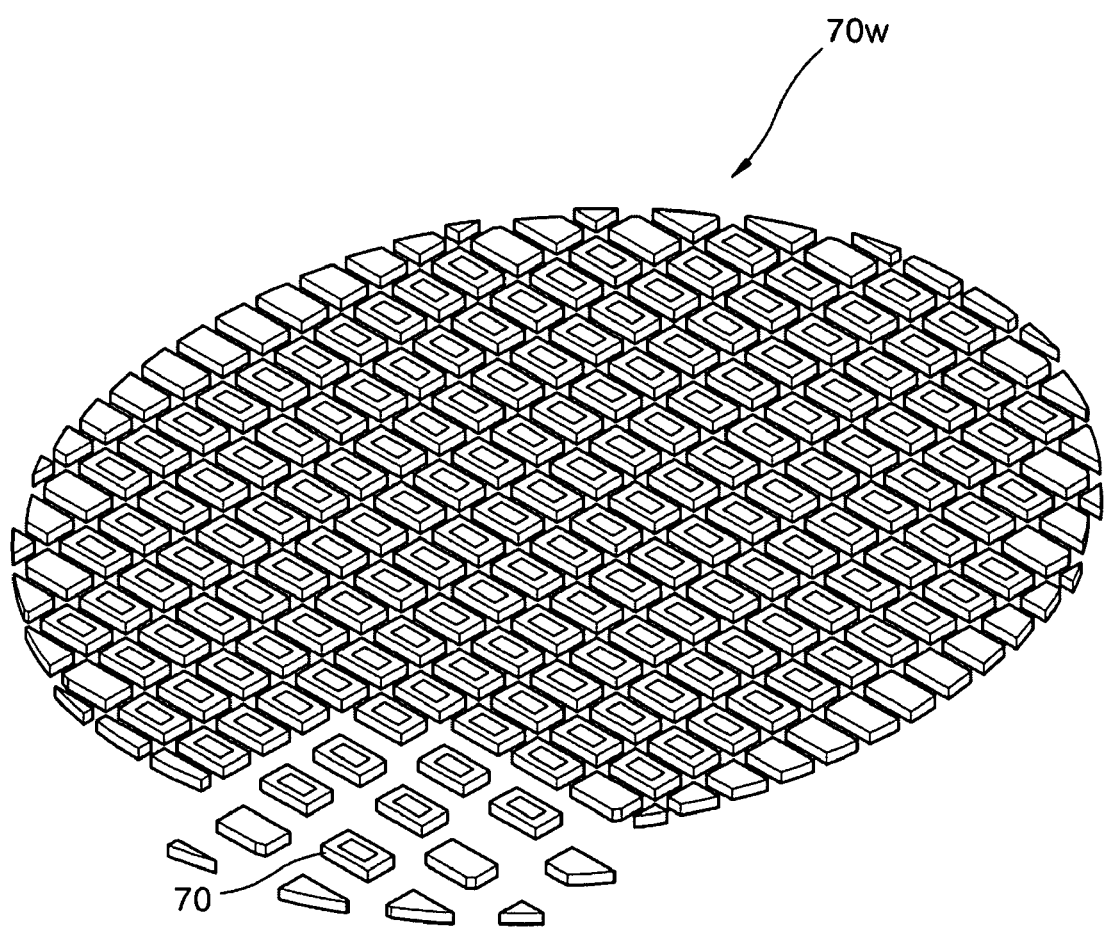
FIG. 7 is a schematic diagram illustrating a process of forming an optical pickup assembly by bonding the wafer shown in FIG. 6A to the wafer shown in FIG. 6B and then dicing the wafers.

FIG. 6B is a schematic diagram of an optical bench wafer 71W on which an optical bench 71 is formed, and a circle B is a partial enlarged view of the optical bench 71. FIG. 7 illustrates steps of forming an optical pickup assembly 70 by bonding the light-collecting and optical path separating member wafer 77W to the optical bench wafer 71W.

The optical pickup manufacturing method presented with reference to FIGS. 5A through 7 is not limited to the above embodiment. For example, the light-collecting and optical path separating member wafer 77W shown in FIG. 6A and the optical bench wafer 71W shown in FIG. 6B can be first diced respectively, individually assembled, and then wired and packaged. Or, an etching process for forming a stepped portion on the optical bench 71 shown in FIG. 6B can be further performed, letting the optical bench have such a shape as shown in FIGS. 2A and 2B. The optical bench 71 can also have such shapes as shown in optical pickups according to fifth through seventh exemplary embodiments which will be described later, and can be varied in shapes without departing from the scope and spirit of the present invention.

To form the optical bench 31 shown in FIGS. 1A and 1B, a photosensitive layer is first applied on a silicon substrate, and a mask corresponding to a pattern of the bottom part on which the light source is located is disposed on the silicon substrate to be subjected to exposure, developing and etching processes to form the bottom part. An electric pattern is formed on the bottom part and the light source 32 is disposed on the bottom surface, and then, the main photo-detectors 36a and 36b and the monitor photo-detector 38 are mounted on the second lateral side part 34b. Next, a wire is connected to the light source 32, the main photo-detectors 36a and 36b, and the monitor photo-detector 38. The light-collecting and optical path separating member 37 is bonded onto the optical bench 31 to be packaged, thereby completing the optical pickup.

Figure 8:
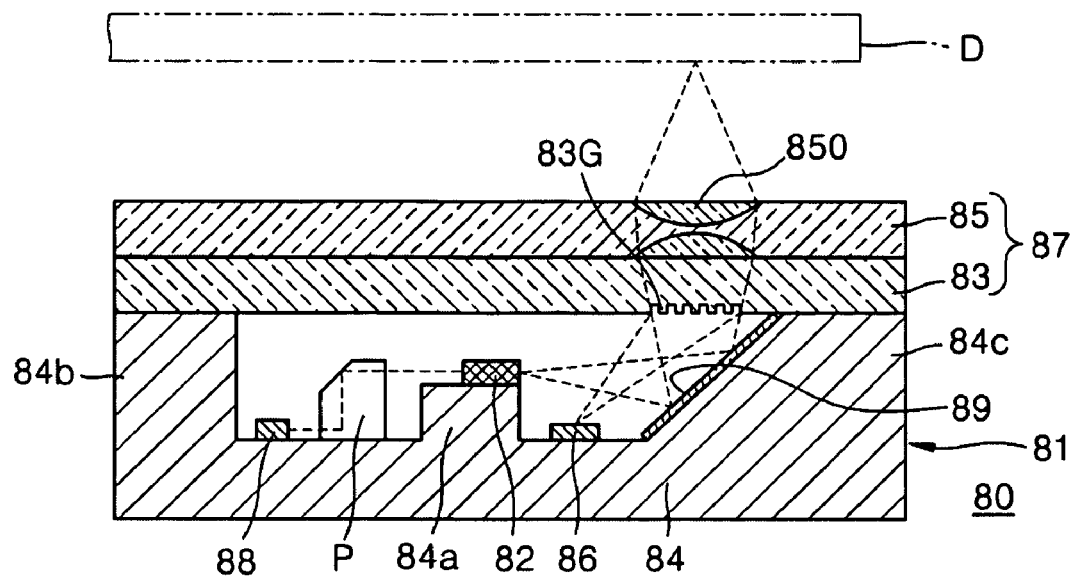
FIG. 8 is a schematic sectional view of an optical pickup according to a fifth exemplary embodiment of the present invention.

FIG. 8 is a schematic sectional view of an optical pickup according to a fifth exemplary embodiment of the present invention. An optical pickup 80 according to the fifth exemplary embodiment is different from the optical pickup 60 according to the fourth exemplary embodiment in that a monitor photo-detector 88 is disposed on a bottom part 84 and a prism P is further interposed between a light source 82 and the monitor photo-detector 88 to guide light emitted from the light source 82 to the monitor photo-detector 88, thereby optical interference with light received by a main photo-detector 86 maximally avoided.

Referring to FIG. 8, reference numeral 81 denotes an optical bench, 82 denotes the light source, 83 denotes an optical path separating member, 83G denotes a diffraction grating, 84 denotes the bottom part, 84a denotes a first mount, 84b denotes a second lateral side part, 84c denotes a first lateral side part, 85 denotes a light-collecting member, 850 denotes an objective lens, 86 denotes the main photo-detector, 87 denotes a light-collecting and optical path separating member, 88 denotes the monitor photo-detector, and 89 denotes a first surface.

Functions of the optical elements of the optical pickup 80 and an optical path according to the fifth exemplary embodiment are similar or equal to those of the optical pickup 60 according to the fourth exemplary embodiment.

Figure 9:
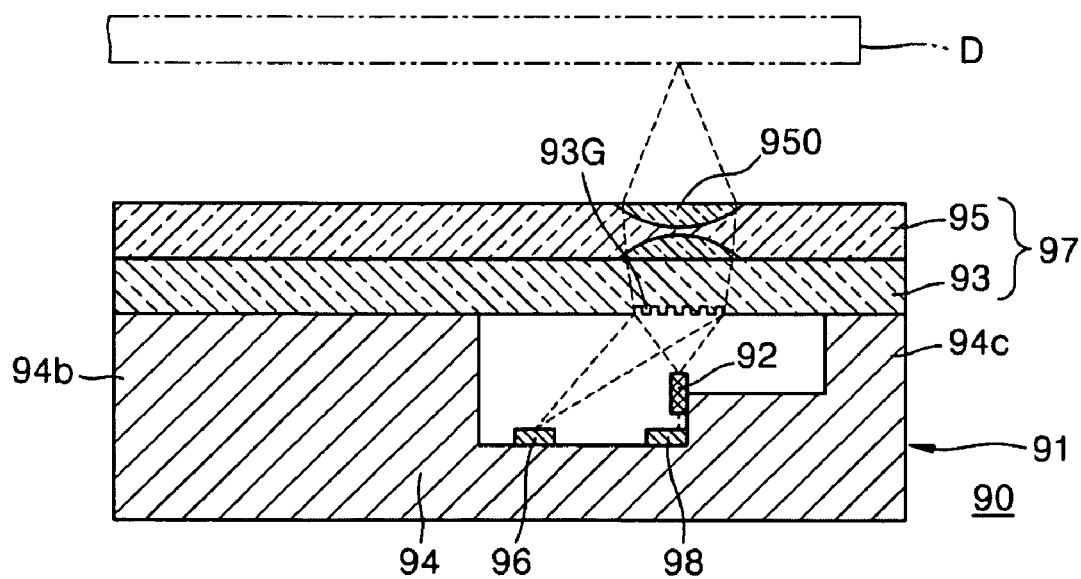
FIG. 9 is a schematic sectional view of an optical pickup according to a sixth exemplary embodiment of the present invention.

FIG. 9 is a schematic sectional view of an optical pickup according to a sixth exemplary embodiment of the present invention.

Referring to FIG. 9, an optical pickup 90 includes an optical bench 91 at one side of which a stepped portion is formed, and a light-collecting and optical path separating member 97 interposed between the optical bench 91 and an optical disc D. A light source 92 is disposed at one lateral surface of the stepped portion of the optical bench 91. A monitor photo-detector 98 is formed under the light source 92 on a bottom surface of the optical bench 91. A main photo-detector 96 is disposed on the bottom surface of the optical bench 91 to be spaced apart from the monitor photo-detector 98 by a predetermined distance. An optical path separating member 93 and a light-collecting member 95 are sequentially combined to successively arrange a diffraction grating 93G and an objective lens 950 such that the light-collecting and optical path separating member 97 is disposed on a top surface facing a bottom part 94 of the optical bench 91.

Light emitted from the light source 92 passes through the diffraction grating 93G and then is refracted by the objective lens 950 to be focused on the optical disc D. Light reflected from the optical disc D proceeds in a reverse order to be diffracted by the diffraction grating 93G by a predetermined angle and then to be received by the main photo-detector 96.

Figure 10:
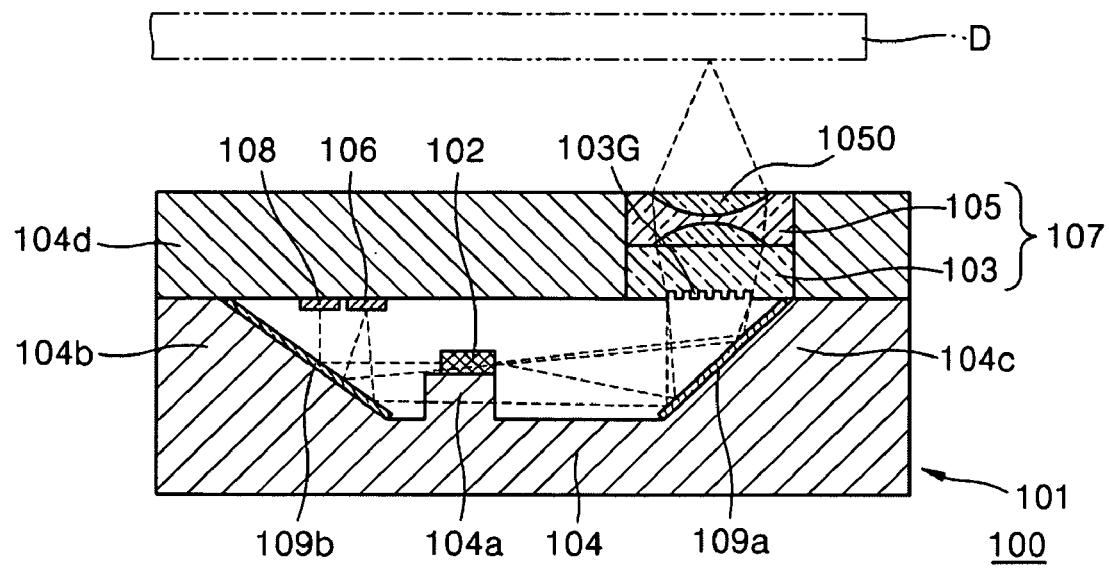
FIG. 10 is a schematic sectional view of an optical pickup according to a seventh exemplary embodiment of the present invention.

FIG. 10 is a schematic sectional view of an optical pickup according to a seventh exemplary embodiment of the present invention. An optical pickup 100 according to the seventh exemplary embodiment is different from the optical pickup 30 according to the first exemplary embodiment in that a main photo-detector 106 and a monitor photo-detector 108 are formed above an optical bench 101. More specifically, these detectors are formed on a bottom surface of a support part 104d, which faces a bottom part 104 and is formed on second and first lateral side parts 104b and 104c. The support part 104d may be a spacer having an aperture into which a light-collecting and optical path separating member 107 is inserted. Alternatively, the support part 104d may be an extension of the light-collecting and optical path separating member 107.

The first lateral side part 104c having a first surface 109a is formed between a light source 102 and the light-collecting and optical path separating member 107. A second surface 109b, that is, a mirror surface, of the second lateral side part 104b guides light emitted from the light source 102 to a monitor photo-detector 108, and also guides light, which is reflected from an optical disc D, passes through the light-collecting and optical path separating member 107, and is reflected from the first surface 109a, toward the main photo-detector 106.

Referring to FIG. 10, reference numeral 103 denotes an optical path separating member, 103G denotes a diffraction grating, 104 denotes a bottom part, 104a denotes a first mount, 104b denotes the second lateral side part, 104c denotes the first lateral side part, 105 denotes a light-collecting member, 107 denotes the light-collecting and optical path separating member, and 1050 denotes an objective lens.

Figure 11:
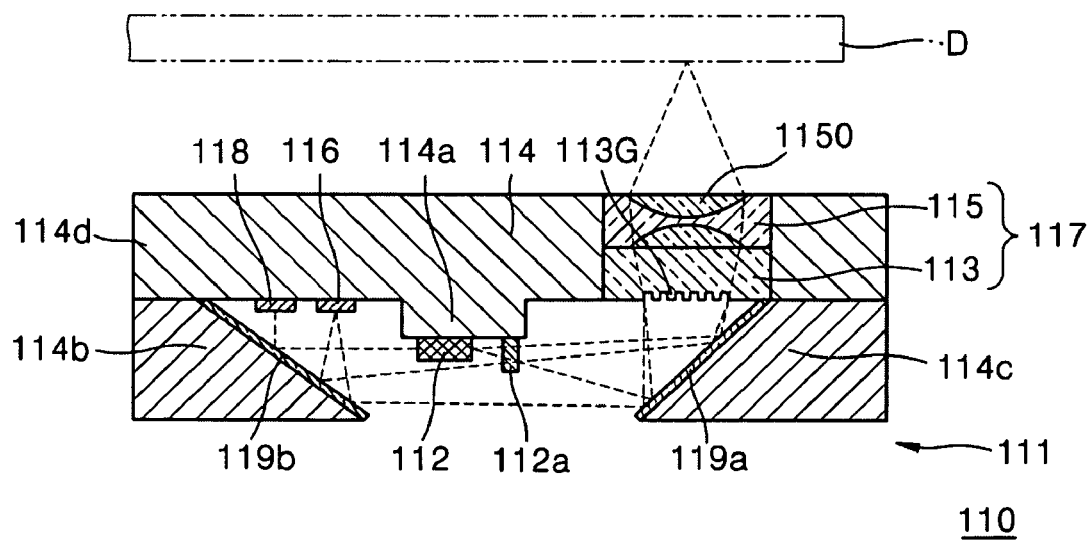
FIG. 11 is a schematic sectional view of an optical pickup according to an eighth exemplary embodiment of the present invention.

FIG. 11 is a schematic sectional view of an optical pickup according to an eighth exemplary embodiment of the present invention. An optical pickup 110 according to the eighth exemplary embodiment is different from the optical pickup 100 according to the seventh exemplary embodiment in that a light source 112 is also disposed above an optical bench 111, that is, on a bottom surface of a support part 114d, and the optical bench 111 does not have a bottom surface. A collimator for aligning light, a diffraction grating for separating light into a plurality of light beams of different optical paths, or a light shaping member 112a, such as a beam shaper, for shaping light which has an elliptic section to one having a circular section may be further disposed in front of the light source 112.

A first surface 119a is formed on a first lateral side part 114c between the optical bench 111 and a light-collecting and optical path separating member 117, similarly to the optical pickup 100 according to the seventh exemplary embodiment of the present invention. A second surface 119b is formed on a second lateral side part 114b of the optical bench 111 and is adapted to guide light emitted from the light source 112 to a monitor photo-detector 118 and guide light, which is reflected from an optical disc D, passes through the light-collecting and optical path separating member 117, and is reflected from the first surface 119a, to a main photo-detector 106.

Referring to FIG. 11, reference numeral 113 denotes an optical path separating member, 113G denotes the diffraction grating, 114a denotes a first mount, 114b denotes a second lateral side part, 114c denotes a first lateral side part, 115 denotes a light-collecting member, 1150 denotes an objective lens, 116 denotes a main photo-detector, and 118 denotes a monitor photo-detector.

Figure 12:
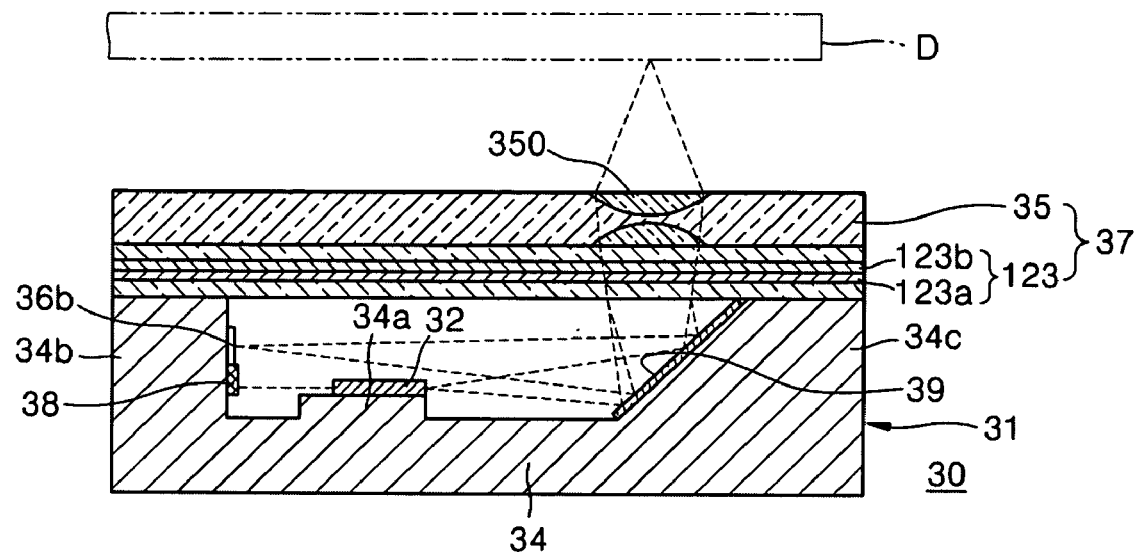
FIG. 12 is a schematic sectional view of an optical pickup according to a ninth exemplary embodiment of the present invention.

Further, as shown in FIG. 12, an optical pickup according to the present invention may comprise a polarization selective optical path separating member 123 instead of the optical path separating member having the diffraction grating.

The polarization selective optical path separating member 123 includes a polarization diffraction element 123a, namely, a polarization holographic element, which directly transmits or diffracts incident light according to the polarization of the incident light, and a quarter wave-plate 123b, which changes the polarization of the incident light.

A semiconductor laser used as the light source 32 emits laser light having a superior linear polarization component. Accordingly, the semiconductor laser emits approximately s-polarized or p-polarized light.

Therefore, when the polarization diffraction element 123 transmits linearly polarized light emitted from the light source 32, if light having transmitted through the polarization diffraction element 123a passes through the quarter wave-plate 123b, it becomes first circularly polarized light. The first circularly polarized light is reflected from the optical disc D and thus becomes second circularly polarized light orthogonal to the first circularly polarized light. While the second circularly polarized light passes through the quarter wave-plate 123b, it become first linearly polarized light, and then is diffracted by the polarization diffraction element 123a.

Consequently, the polarized light selectively diffracting and optical path separating member 123 can separate an optical path of light directed toward the optical disc D from an optical path of light reflected from the optical disc D.

Figure 13:
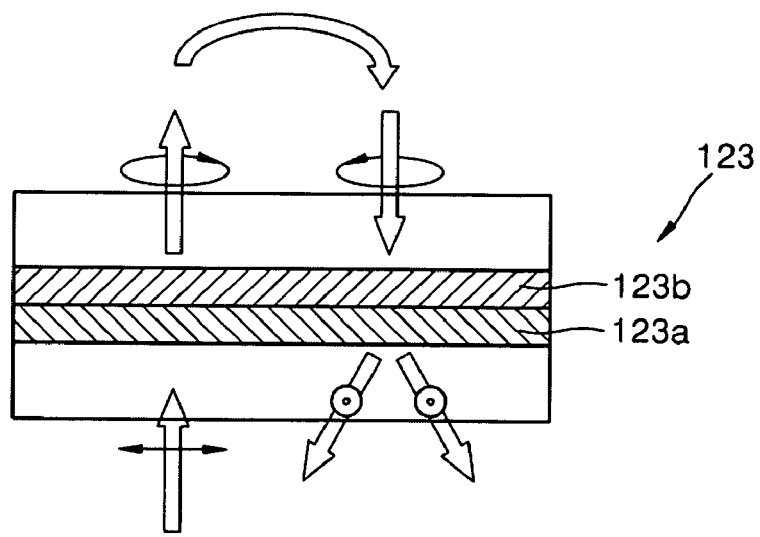
FIG. 13 is a schematic sectional view for explaining a selective diffraction performed according to polarization by a polarization selective optical path separating member of the optical pickup shown in FIG. 12.

While FIG. 12 shows that the polarization selective optical path separating member 123 is used instead of the optical path separating member 33 for the optical pickup of FIG. 1B, the polarization selective optical path separating member can be applied to other embodiments previously mentioned. Since the application of the polarization selective optical path separating member 123 may be well inferred from the description with reference to FIGS. 12 and 13, and thus detailed explanation and illustration and will not be given.

Various exemplary embodiments of the optical pickup according to the present invention have been explained with reference to the drawings. However, various changes in form and details may be made therein without departing from the spirit and scope of the present invention as defined by the following claims.

For example, the optical pickups according to the exemplary embodiments are illustrated as examples, and accordingly, arrangements of the optical elements in the light-collecting member and the optical bench can be varied.

Figure 14:
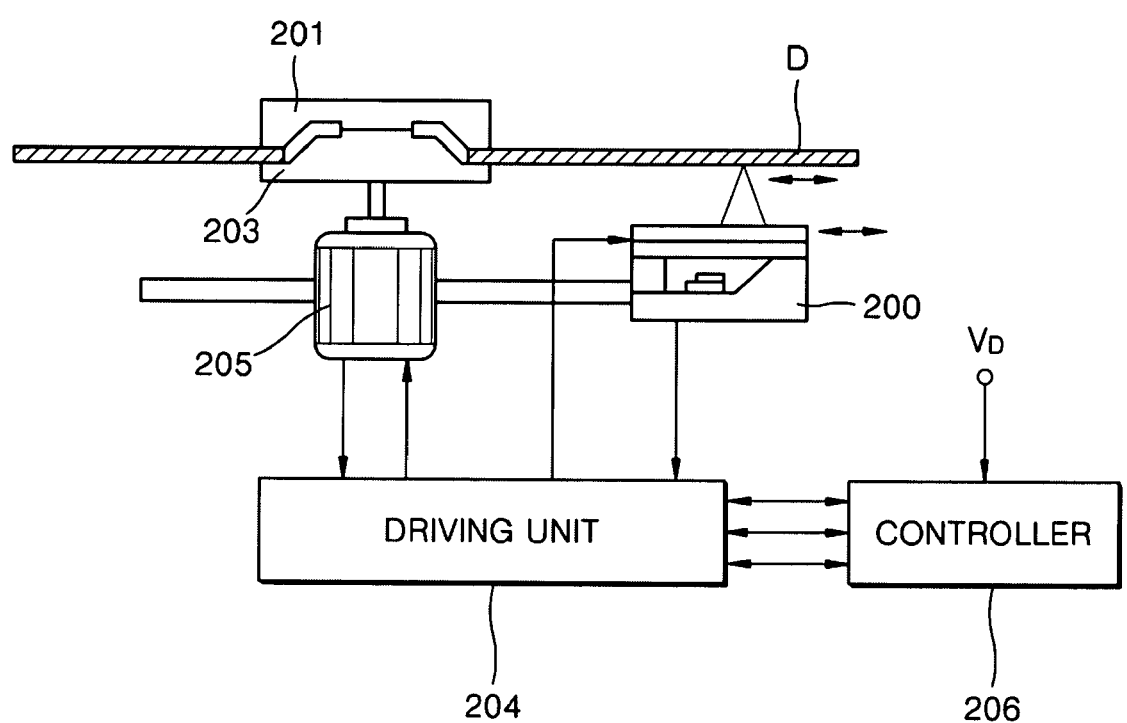
FIG. 14 is a schematic diagram illustrating a configuration of an optical information storage system according to an exemplary embodiment of the present invention.

FIG. 14 is a schematic diagram illustrating a configuration of an optical information storage system comprising an optical pickup according to an exemplary embodiment of the present invention.

Referring to FIG. 14, the optical information storage system includes a spindle motor 205 for rotating an optical disc D, an optical pickup 200 installed to be movable in a radial direction of the optical disc D and adapted to reproduce information recorded on the optical disc D and/or record information, a driving unit 204 for driving the spindle motor 205 and the optical pickup 200, and a controller 206 for controlling a focusing/tracking servo of the optical pickup 200.

The optical pickup 200 includes an actuator which drives a mounted objective lens in a focusing and tracking direction. Reference numeral 203 designates a turn table on which the optical disc D is mounted, and reference numeral 201 designates a clamping for chucking the optical disc D.

A signal detected and photoelectrically converted by the optical pickup 200 is input to the controller 206 through the driving unit 204. The driving unit 204 controls a rotational speed of the spindle motor 205, amplifies an input signal, and drives the optical pickup 200. The controller 206 sends an instruction of the focusing and tracking servo, which is controlled based on a signal input from the driving unit 204, to the driving unit 204 again to perform a focusing and tracking servo function.

According to the present invention, an ultra-small integrated optical pickup can be manufactured on a wafer with high reliability, which has paved the way for future mass production of optical pickups at a low cost. An optical information storage system comprising the optical pickup can be realized as a portable one.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An integrated optical pickup comprising:
 a light source;
 a main photo-detector, which receives light emitted from the light source and reflected from an optical information storage medium;
 a light-collecting and optical path separating member disposed on a portion of a first wafer, and operable to focus light emitted from the light source on the optical information storage medium and separates an optical path of light incident on the optical information storage medium from an optical path of light reflected from the optical information storage medium; and
 an optical bench disposed on a portion of a second wafer and coupled to the light-collecting and optical path separating member, an optical path being formed between the light source and the main photo-detector, and the light-collecting and optical path separating member;
 wherein the optical bench includes a first lateral side part having a first surface that reflects the light emitted from the light source toward the light-collecting and optical path separating member; and
 the light source is disposed on a bottom part of the optical bench, and the main photo-detector is disposed on either the bottom part of the optical bench or a second lateral side part opposite to the first lateral side part.

2. The integrated optical pickup of claim 1, further comprising a monitor photo-detector, operable to monitor the intensity of light of the light source,
 wherein the monitor photo-detector is disposed at the same surface as the main photo-detector, or the main photo-detector is disposed on one of the bottom part and the second lateral side part of the optical bench and the monitor photo-detector is disposed on the remaining part.

3. The integrated optical pickup of claim 1, wherein the light-collecting and optical path separating member are composed of a light-collecting member and an optical path separating member.

4. An integrated optical pickup comprising:
 a light source;
 a main photo-detector, which receives light emitted from the light source and reflected from an optical information storage medium;
 a light-collecting and optical path separating member disposed on a portion of a first wafer, and operable to focus light emitted from the light source on the optical information storage medium and separates an optical path of light incident on the optical information storage medium from an optical path of light reflected from the optical information storage medium; and
 an optical bench disposed on a portion of a second wafer and coupled to the light-collecting and optical path separating member, an optical path being formed between the light source and the main photo-detector, and the light-collecting and optical path separating member;
 wherein the light-collecting and optical path separating member are composed of a light-collecting member and an optical path separating member; and
 the light-collecting member includes one of a refractive lens, a diffractive lens and a gradient index lens being used singly or plurally, and a hybrid lens composed of at least two kinds of the lenses.

5. The integrated optical pickup of claim 3, wherein the optical path separating member includes a holographic optical element (HOE) or a diffractive optical element (DOE).

6. The integrated optical pickup of claim 3, wherein the optical path separating member includes a polarization diffraction element and a quarter wave-plate.

7. The integrated optical pickup of claim 3, further comprising a spacer having an aperture and disposed between the light-collecting member and the optical path separating member.

8. The integrated optical pickup of claim 1, wherein the optical bench has a stepped portion on which the light-collecting and optical path separating member is placed.

9. A method of manufacturing an integrated optical pickup, which includes a light-collecting and optical path separating member for focusing light emitted from a light source on an optical information storage medium and separating an optical path of light incident on the optical information storage medium from an optical path of light reflected from the optical information storage medium, and an optical bench wherein an optical path is formed between the light source and a main photo-detector, and the light-collecting and optical path separating member, the method comprising:

preparing an optical bench wafer on which an optical bench is formed and a light-collecting and optical path separating member wafer on which a light-collecting and optical path separating member is formed;

coupling the light-collecting and optical path separating member wafer to the optical bench wafer to form an integrated optical pickup assembly wafer;

dicing the optical pickup assembly wafer or dicing the light-collecting and optical path separating member wafer and the optical bench wafer;

coupling a light-collecting and optical path separating member and an optical bench obtained through the dicing to form an integrated optical pickup assembly; and wiring and packaging the integrated optical pickup assembly;

wherein the optical bench includes a first lateral side part having a first surface that reflects the light emitted from the light source toward the light-collecting and optical path separating member; and the light source is disposed on a bottom part of the optical bench, and the main photo-detector is disposed on either the bottom part of the optical bench or a second lateral side part opposite to the first lateral side part.

10. The method of 9, wherein the integrated optical pickup further comprises a monitor photo-detector, which monitors the intensity of light of the light source, wherein the monitor photo-detector is disposed on the same surface as the main photo-detector or the main photo-detector is disposed on one of the bottom part and the second lateral side part of the optical bench and the monitor photo-detector is disposed on the remaining part.

11. The method of claim 9, wherein the light-collecting and optical path separating member is composed of a light-collecting member and an optical path separating member.

12. A method of manufacturing an integrated optical pickup, which includes a light-collecting and optical path separating member for focusing light emitted from a light source on an optical information storage medium and separating an optical path of light incident on the optical information storage medium from an optical path of light reflected from the optical information storage medium, and an optical bench wherein an optical path is formed between the light source and a main photo-detector, and the light-collecting and optical path separating member, the method comprising:

preparing an optical bench wafer on which an optical bench is formed and a light-collecting and optical path separating member wafer on which a light-collecting and optical path separating member is formed;

coupling the light-collecting and optical path separating member wafer to the optical bench wafer to form an integrated optical pickup assembly wafer;

dicing the optical pickup assembly wafer or dicing the light-collecting and optical path separating member wafer and the optical bench wafer;

coupling a light-collecting and optical path separating member and an optical bench obtained through the dicing to form an integrated optical pickup assembly; and wiring and packaging the integrated optical pickup assembly;

wherein the light-collecting and optical path separating member is composed of a light-collecting member and an optical path separating member; and the light-collecting member includes one of a refractive lens, a diffractive lens and a gradient index lens being used singly or plurally, and a hybrid lens composed of at least two kinds of the lenses.

13. The method of claim 11, wherein the optical path separating member includes a holographic optical element (HOE) or a diffractive optical element (DOE).

14. The method of claim 11, wherein the optical path separating member includes a polarization diffraction element and a quarter wave-plate.

15. The method of claim 11, wherein the integrated optical pickup further comprises a spacer having an aperture and is disposed between the light-collecting member and the optical path separating member.

16. The method of claim 9, wherein the optical bench has a stepped portion on which the light-collecting and optical path separating member is placed.

17. An optical information storage system comprising an integrated optical pickup comprising:

a light source;

a main photo-detector, operable to receive light emitted from the light source and reflected from an optical information storage medium;

a light-collecting and optical path separating member disposed on a portion of a first wafer and operable to focus light emitted from the light source on the optical information storage medium and separate an optical path of light incident on the optical information storage medium from an optical path of light reflected from the optical information storage medium; and an optical bench disposed on a portion of a second wafer and coupled to the light-collecting and optical path separating member, an optical path being formed between the light source and the main photo-detector, and the light-collecting and optical path separating member;

an optical information storage medium rotating unit, operable to rotate the optical information storage medium;

a driving unit, operable to drive the integrated optical pickup and the optical information storage medium rotating unit; and a controller, operable to control the driving unit to control focusing and tracking servos;

wherein the optical bench includes a second lateral side part having a first surface for reflecting the light emitted from the light source toward the light-collecting and optical path separating member; and the light source is disposed on a bottom part of the optical bench, and the main photo-detector is disposed on either the bottom part of the optical bench or a second lateral side part opposite to the first lateral side part.

18. The optical information storage system of claim 17, further comprising a monitor photo-detector, which monitors the intensity of light of the light source, wherein the monitor photo-detector is disposed on the same surface as the main photo-detector, or the main photo-detector is disposed on one of the bottom part and the second lateral side part of the optical bench and the monitor photo-detector is disposed on the remaining part.

19. The optical information storage system of claim 17, wherein the light-collecting and optical path separating member is composed of a light-collecting member and an optical path separating member.

20. An optical information storage system comprising an integrated optical pickup comprising:
   a light source;
   a main photo-detector, operable to receive light emitted from the light source and reflected from an optical information storage medium;
   a light-collecting and optical path separating member disposed on a portion of a first wafer and operable to focus light emitted from the light source on the optical information storage medium and separate an optical path of light incident on the optical information storage medium from an optical path of light reflected from the optical information storage medium; and
   an optical bench disposed on a portion of a second wafer and coupled to the light-collecting and optical path separating member, an optical path being formed between the light source and the main photo-detector, and the light-collecting and optical path separating member;
   an optical information storage medium rotating unit, operable to rotate the optical information storage medium;
   a driving unit, operable to drive the integrated optical pickup and the optical information storage medium rotating unit; and
   a controller, operable to control the driving unit to control focusing and tracking servos;
   wherein the light-collecting and optical path separating member is composed of a light-collecting member and an optical path separating member; and
   the light-collecting member includes one of a refractive lens, a diffractive lens and a gradient index lens being used singly or plurally, and a hybrid lens composed of at least two kinds of lenses thereof.

21. The optical information storage system of claim 19, wherein the optical path separating member includes a holographic optical element (HOE) or a diffractive optical element (DOE).

22. The optical information storage system of claim 19, wherein the optical path separating member includes a polarization diffraction element and a quarter wave-plate.

23. The optical information storage system of claim 19, further comprising a spacer having an aperture and disposed between the light-collecting member and the optical path separating member.

24. The optical information storage system of claim 17, wherein the optical bench has a stepped portion on which the light-collecting and optical path separating member is placed.

* * * * *